US010681000B2

(12) United States Patent
Wang et al.

(10) Patent No.: US 10,681,000 B2
(45) Date of Patent: Jun. 9, 2020

(54) ASSIGNMENT OF UNIQUE PHYSICAL NETWORK ADDRESSES FOR LOGICAL NETWORK ADDRESSES

(71) Applicant: Nicira, Inc., Palo Alto, CA (US)

(72) Inventors: Yusheng Wang, Beijing (CN); Donghai Han, Beijing (CN)

(73) Assignee: NICIRA, INC., Palo Alto, CA (US)

( * ) Notice: Subject to any disclaimer, the term of this patent is extended or adjusted under 35 U.S.C. 154(b) by 178 days.

(21) Appl. No.: 15/640,376

(22) Filed: Jun. 30, 2017

(65) Prior Publication Data

US 2019/0007364 A1 Jan. 3, 2019

(51) Int. Cl.
*H04L 29/12* (2006.01)

(52) U.S. Cl.
CPC ........ *H04L 61/103* (2013.01); *H04L 61/2514* (2013.01); *H04L 61/2521* (2013.01); *H04L 61/6022* (2013.01); *H04L 61/10* (2013.01); *H04L 61/20* (2013.01); *H04L 61/2007* (2013.01)

(58) Field of Classification Search
CPC ... H04L 61/103; H04L 61/6022; H04L 61/10; H04L 61/20
USPC ........................................................ 709/245
See application file for complete search history.

(56) References Cited

U.S. PATENT DOCUMENTS

| 5,504,921 | A | | 4/1996 | Dev et al. | |
|---|---|---|---|---|---|
| 5,550,816 | A | * | 8/1996 | Hardwick | ........... H04L 12/4604 370/397 |
| 5,729,685 | A | * | 3/1998 | Chatwani | .......... H04L 29/12018 370/254 |
| 5,751,967 | A | | 5/1998 | Raab et al. | |
| 5,923,854 | A | * | 7/1999 | Bell | ........................ H04L 29/06 370/409 |
| 6,104,699 | A | | 8/2000 | Holender et al. | |
| 6,111,876 | A | | 8/2000 | Frantz et al. | |

(Continued)

FOREIGN PATENT DOCUMENTS

| JP | 2004145684 | A | 5/2004 |
|---|---|---|---|
| WO | 2003058584 | A2 | 7/2003 |

(Continued)

OTHER PUBLICATIONS

Author Unknown, "Cisco VN-Link: Virtualization-Aware Networking," Month Unknown 2009, 10 pages, Cisco Systems, Inc.

(Continued)

*Primary Examiner* — Glenford J Madamba
(74) *Attorney, Agent, or Firm* — Adeli LLP

(57) ABSTRACT

Some embodiments provide a method for a network controller that manages multiple logical networks implemented by multiple managed forwarding elements (MFEs) operating on multiple host machines. The method receives a notification from a particular MFE that an interface corresponding to a logical port of a logical forwarding element has connected to the particular MFE and has a particular logical network address. The method assigns a unique physical network address to the interface. Each of multiple interfaces connected to the particular MFE is assigned a different physical network address. The method provides the assigned unique physical network address to the particular MFE for the particular MFE to convert data messages sent from the particular logical network address to have the unique physical network address.

20 Claims, 9 Drawing Sheets

(56) References Cited

U.S. PATENT DOCUMENTS

| | | |
|---|---|---|
| 6,151,324 A | 11/2000 | Belser et al. |
| 6,151,329 A | 11/2000 | Berrada et al. |
| 6,219,699 B1 | 4/2001 | McCloghrie et al. |
| 6,456,624 B1 | 9/2002 | Eccles et al. |
| 6,512,745 B1 | 1/2003 | Abe et al. |
| 6,539,432 B1 | 3/2003 | Abe et al. |
| 6,680,934 B1 | 1/2004 | Cain |
| 6,765,921 B1 | 7/2004 | Stacey et al. |
| 6,785,843 B1 | 8/2004 | McRae et al. |
| 6,941,487 B1 | 9/2005 | Balakrishnan et al. |
| 6,963,585 B1 | 11/2005 | Le Pennec et al. |
| 6,999,454 B1 | 2/2006 | Crump |
| 7,046,630 B2 | 5/2006 | Abe et al. |
| 7,120,728 B2 | 10/2006 | Krakirian et al. |
| 7,146,431 B2 | 12/2006 | Hipp et al. |
| 7,197,572 B2 | 3/2007 | Matters et al. |
| 7,200,144 B2 | 4/2007 | Terrell et al. |
| 7,203,944 B1 | 4/2007 | van Rietschote et al. |
| 7,209,439 B2 | 4/2007 | Rawlins et al. |
| 7,260,102 B2 | 8/2007 | Mehrvar et al. |
| 7,260,648 B2 | 8/2007 | Tingley et al. |
| 7,263,700 B1 | 8/2007 | Bacon et al. |
| 7,277,453 B2 | 10/2007 | Chin et al. |
| 7,283,473 B2 | 10/2007 | Arndt et al. |
| 7,339,929 B2 | 3/2008 | Zelig et al. |
| 7,366,182 B2 | 4/2008 | O'Neill |
| 7,391,771 B2 | 6/2008 | Orava et al. |
| 7,450,498 B2 | 11/2008 | Golia et al. |
| 7,450,598 B2 * | 11/2008 | Chen .................. H04L 12/4641 370/254 |
| 7,463,579 B2 | 12/2008 | Lapuh et al. |
| 7,467,198 B2 | 12/2008 | Goodman et al. |
| 7,478,173 B1 | 1/2009 | Delco |
| 7,483,370 B1 | 1/2009 | Dayal et al. |
| 7,512,744 B2 | 3/2009 | Banga et al. |
| 7,554,995 B2 | 6/2009 | Short et al. |
| 7,555,002 B2 | 6/2009 | Arndt et al. |
| 7,577,722 B1 | 8/2009 | Khandekar et al. |
| 7,606,260 B2 | 10/2009 | Oguchi et al. |
| 7,633,909 B1 | 12/2009 | Jones et al. |
| 7,634,608 B2 | 12/2009 | Droux et al. |
| 7,640,298 B2 | 12/2009 | Berg |
| 7,643,482 B2 | 1/2010 | Droux et al. |
| 7,643,488 B2 | 1/2010 | Khanna et al. |
| 7,649,851 B2 | 1/2010 | Takashige et al. |
| 7,660,324 B2 | 2/2010 | Oguchi et al. |
| 7,710,874 B2 | 5/2010 | Balakrishnan et al. |
| 7,715,416 B2 | 5/2010 | Srinivasan et al. |
| 7,716,667 B2 | 5/2010 | van Rietschote et al. |
| 7,725,559 B2 | 5/2010 | Landis et al. |
| 7,752,635 B2 | 7/2010 | Lewites |
| 7,761,259 B1 | 7/2010 | Seymour |
| 7,764,599 B2 | 7/2010 | Doi et al. |
| 7,792,987 B1 | 9/2010 | Vohra et al. |
| 7,797,507 B2 | 9/2010 | Tago |
| 7,801,128 B2 | 9/2010 | Hoole et al. |
| 7,802,000 B1 | 9/2010 | Huang et al. |
| 7,814,228 B2 | 10/2010 | Caronni et al. |
| 7,814,541 B1 | 10/2010 | Manvi et al. |
| 7,818,452 B2 | 10/2010 | Matthews et al. |
| 7,826,482 B1 | 11/2010 | Minei et al. |
| 7,839,847 B2 | 11/2010 | Nadeau et al. |
| 7,840,701 B2 | 11/2010 | Hsu et al. |
| 7,843,906 B1 | 11/2010 | Chidambaram et al. |
| 7,853,714 B1 | 12/2010 | Moberg et al. |
| 7,865,893 B1 | 1/2011 | Omelyanchuk et al. |
| 7,865,908 B2 | 1/2011 | Garg et al. |
| 7,885,276 B1 | 2/2011 | Lin |
| 7,895,642 B1 | 2/2011 | Larson et al. |
| 7,936,770 B1 | 5/2011 | Frattura et al. |
| 7,941,812 B2 | 5/2011 | Sekar |
| 7,948,986 B1 | 5/2011 | Ghosh et al. |
| 7,958,506 B2 | 6/2011 | Mann |
| 7,983,257 B2 | 7/2011 | Chavan et al. |
| 7,983,266 B2 | 7/2011 | Srinivasan et al. |
| 7,984,108 B2 | 7/2011 | Landis et al. |
| 7,987,432 B1 | 7/2011 | Grechishkin et al. |
| 7,995,483 B1 | 8/2011 | Bayar et al. |
| 8,001,214 B2 | 8/2011 | Loefstrand |
| 8,001,269 B1 * | 8/2011 | Satapati ............ H04L 29/12028 709/245 |
| 8,005,013 B2 | 8/2011 | Teisberg et al. |
| 8,018,873 B1 | 9/2011 | Kompella |
| 8,019,837 B2 | 9/2011 | Kannan et al. |
| 8,027,354 B1 | 9/2011 | Portolani et al. |
| 8,031,606 B2 | 10/2011 | Memon et al. |
| 8,031,633 B2 | 10/2011 | Bueno et al. |
| 8,036,127 B2 | 10/2011 | Droux et al. |
| 8,051,180 B2 | 11/2011 | Mazzaferri et al. |
| 8,054,832 B1 | 11/2011 | Shukla et al. |
| 8,055,789 B2 | 11/2011 | Richardson et al. |
| 8,060,875 B1 | 11/2011 | Lambeth |
| 8,065,714 B2 | 11/2011 | Budko et al. |
| 8,068,602 B1 | 11/2011 | Bluman et al. |
| RE43,051 E | 12/2011 | Newman et al. |
| 8,074,218 B2 | 12/2011 | Eilam et al. |
| 8,108,855 B2 | 1/2012 | Dias et al. |
| 8,127,291 B2 | 2/2012 | Pike et al. |
| 8,135,815 B2 | 3/2012 | Mayer |
| 8,146,148 B2 | 3/2012 | Cheriton |
| 8,149,737 B2 | 4/2012 | Metke et al. |
| 8,155,028 B2 | 4/2012 | Abu-Hamdeh et al. |
| 8,166,201 B2 | 4/2012 | Richardson et al. |
| 8,166,205 B2 | 4/2012 | Farinacci et al. |
| 8,171,485 B2 | 5/2012 | Muller |
| 8,190,769 B1 | 5/2012 | Shukla et al. |
| 8,194,674 B1 * | 6/2012 | Pagel .................. H04L 12/4641 370/393 |
| 8,199,750 B1 | 6/2012 | Schultz et al. |
| 8,200,752 B2 | 6/2012 | Choudhary et al. |
| 8,201,180 B2 | 6/2012 | Briscoe et al. |
| 8,209,684 B2 | 6/2012 | Kannan et al. |
| 8,214,193 B2 | 7/2012 | Chawla et al. |
| 8,223,668 B2 | 7/2012 | Allan et al. |
| 8,248,967 B2 | 8/2012 | Nagy et al. |
| 8,265,075 B2 | 9/2012 | Pandey |
| 8,281,067 B2 | 10/2012 | Stolowitz |
| 8,281,363 B1 | 10/2012 | Hernacki et al. |
| 8,286,174 B1 | 10/2012 | Schmidt et al. |
| 8,289,975 B2 | 10/2012 | Suganthi et al. |
| 8,339,959 B1 | 12/2012 | Moisand et al. |
| 8,339,994 B2 | 12/2012 | Gnanasekaran |
| 8,345,650 B2 | 1/2013 | Foxworthy et al. |
| 8,346,891 B2 | 1/2013 | Safari et al. |
| 8,351,418 B2 | 1/2013 | Zhao et al. |
| 8,352,608 B1 | 1/2013 | Keagy et al. |
| 8,359,377 B2 | 1/2013 | McGuire |
| 8,370,481 B2 | 2/2013 | Wilson et al. |
| 8,370,834 B2 | 2/2013 | Edwards et al. |
| 8,370,835 B2 | 2/2013 | Dittmer |
| 8,374,183 B2 | 2/2013 | Alkhatib et al. |
| 8,386,642 B2 | 2/2013 | Elzur |
| 8,401,024 B2 | 3/2013 | Christensen et al. |
| 8,407,366 B2 | 3/2013 | Alkhatib et al. |
| 8,473,594 B2 | 6/2013 | Astete et al. |
| 8,515,015 B2 | 8/2013 | Maffre et al. |
| 8,538,919 B1 | 9/2013 | Nielsen et al. |
| 8,549,281 B2 | 10/2013 | Samovskiy et al. |
| 8,565,118 B2 | 10/2013 | Shukla et al. |
| 8,611,351 B2 | 12/2013 | Gooch et al. |
| 8,619,771 B2 | 12/2013 | Lambeth et al. |
| 8,625,603 B1 | 1/2014 | Ramakrishnan et al. |
| 8,627,313 B2 | 1/2014 | Edwards et al. |
| 8,644,188 B1 | 2/2014 | Brandwine et al. |
| 8,650,299 B1 | 2/2014 | Huang et al. |
| 8,656,386 B1 | 2/2014 | Baimetov et al. |
| 8,683,004 B2 | 3/2014 | Bauer |
| 8,683,464 B2 | 3/2014 | Rozee et al. |
| 8,706,764 B2 | 4/2014 | Sivasubramanian et al. |
| 8,725,898 B1 | 5/2014 | Vincent |
| 8,776,050 B2 | 7/2014 | Plouffe et al. |
| 8,798,056 B2 | 8/2014 | Ganga |
| 8,799,431 B2 | 8/2014 | Pabari |
| 8,819,561 B2 | 8/2014 | Gupta et al. |

(56) References Cited

U.S. PATENT DOCUMENTS

| | | | |
|---|---|---|---|
| 8,838,743 B2 | 9/2014 | Lewites et al. | |
| 8,838,756 B2 | 9/2014 | Dalal et al. | |
| 8,850,060 B1 | 9/2014 | Beloussov et al. | |
| 8,868,608 B2 | 10/2014 | Friedman et al. | |
| 8,874,425 B2 | 10/2014 | Cohen et al. | |
| 8,880,659 B2 | 11/2014 | Mower et al. | |
| 8,892,706 B1 | 11/2014 | Dalal | |
| 8,924,524 B2 | 12/2014 | Dalal et al. | |
| 8,953,441 B2 | 2/2015 | Nakil et al. | |
| 9,014,184 B2 | 4/2015 | Iwata et al. | |
| 9,021,092 B2 | 4/2015 | Silva et al. | |
| 9,037,689 B2 | 5/2015 | Khandekar et al. | |
| 9,038,062 B2 | 5/2015 | Fitzgerald et al. | |
| 9,076,342 B2 | 7/2015 | Brueckner et al. | |
| 9,086,901 B2 | 7/2015 | Gebhart et al. | |
| 9,106,540 B2 | 8/2015 | Cohn et al. | |
| 9,172,615 B2 | 10/2015 | Samovskiy et al. | |
| 9,178,850 B2 | 11/2015 | Lain et al. | |
| 9,697,032 B2 | 7/2017 | Dalal et al. | |
| 9,749,149 B2 | 8/2017 | Mazarick | |
| 9,819,649 B2 | 11/2017 | Larson et al. | |
| 9,952,892 B2 | 4/2018 | Dalal et al. | |
| 2001/0043614 A1* | 11/2001 | Viswanadham | H04L 49/602 370/469 |
| 2002/0093952 A1* | 7/2002 | Gonda | H04Q 3/68 370/369 |
| 2002/0194369 A1 | 12/2002 | Rawlins et al. | |
| 2003/0041170 A1 | 2/2003 | Suzuki | |
| 2003/0058850 A1 | 3/2003 | Rangarajan et al. | |
| 2003/0120822 A1 | 6/2003 | Langrind et al. | |
| 2004/0073659 A1 | 4/2004 | Rajsic et al. | |
| 2004/0098505 A1 | 5/2004 | Clemmensen | |
| 2004/0249973 A1 | 12/2004 | Alkhatib et al. | |
| 2004/0267866 A1 | 12/2004 | Carollo et al. | |
| 2004/0267897 A1 | 12/2004 | Hill et al. | |
| 2005/0018669 A1 | 1/2005 | Arndt et al. | |
| 2005/0027881 A1 | 2/2005 | Figueira et al. | |
| 2005/0053079 A1 | 3/2005 | Havala | |
| 2005/0071446 A1 | 3/2005 | Graham et al. | |
| 2005/0083953 A1 | 4/2005 | May | |
| 2005/0120160 A1 | 6/2005 | Plouffe et al. | |
| 2005/0182853 A1 | 8/2005 | Lewites et al. | |
| 2005/0220096 A1 | 10/2005 | Friskney et al. | |
| 2006/0002370 A1 | 1/2006 | Rabie et al. | |
| 2006/0026225 A1 | 2/2006 | Canali et al. | |
| 2006/0029056 A1 | 2/2006 | Perera et al. | |
| 2006/0031407 A1* | 2/2006 | Dispensa | H04L 29/12009 709/219 |
| 2006/0174087 A1 | 8/2006 | Hashimoto et al. | |
| 2006/0187908 A1 | 8/2006 | Shimozono et al. | |
| 2006/0193266 A1 | 8/2006 | Siddha et al. | |
| 2006/0221961 A1 | 10/2006 | Basso et al. | |
| 2006/0245438 A1 | 11/2006 | Sajassi et al. | |
| 2006/0291388 A1 | 12/2006 | Amdahl et al. | |
| 2007/0050520 A1 | 3/2007 | Riley | |
| 2007/0055789 A1 | 3/2007 | Claise et al. | |
| 2007/0064673 A1 | 3/2007 | Bhandaru et al. | |
| 2007/0064704 A1 | 3/2007 | Balay et al. | |
| 2007/0130366 A1 | 6/2007 | O'Connell et al. | |
| 2007/0156919 A1 | 7/2007 | Potti et al. | |
| 2007/0195794 A1 | 8/2007 | Fujita et al. | |
| 2007/0234302 A1 | 10/2007 | Suzuki et al. | |
| 2007/0260721 A1 | 11/2007 | Bose et al. | |
| 2007/0280243 A1 | 12/2007 | Wray et al. | |
| 2007/0286137 A1 | 12/2007 | Narasimhan et al. | |
| 2007/0297428 A1 | 12/2007 | Bose et al. | |
| 2008/0002579 A1 | 1/2008 | Lindholm et al. | |
| 2008/0002683 A1 | 1/2008 | Droux et al. | |
| 2008/0028401 A1 | 1/2008 | Geisinger | |
| 2008/0040477 A1 | 2/2008 | Johnson et al. | |
| 2008/0043756 A1 | 2/2008 | Droux et al. | |
| 2008/0049621 A1 | 2/2008 | McGuire et al. | |
| 2008/0059556 A1 | 3/2008 | Greenspan et al. | |
| 2008/0071900 A1 | 3/2008 | Hecker et al. | |
| 2008/0086726 A1 | 4/2008 | Griffith et al. | |
| 2008/0159301 A1 | 7/2008 | de Heer | |
| 2008/0163207 A1 | 7/2008 | Reumann et al. | |
| 2008/0198858 A1 | 8/2008 | Townsley et al. | |
| 2008/0209415 A1 | 8/2008 | van Riel et al. | |
| 2008/0215705 A1 | 9/2008 | Liu et al. | |
| 2008/0235690 A1 | 9/2008 | Ang et al. | |
| 2008/0244579 A1 | 10/2008 | Muller | |
| 2009/0113021 A1 | 4/2009 | Andersson et al. | |
| 2009/0141729 A1 | 6/2009 | Fan | |
| 2009/0150527 A1 | 6/2009 | Tripathi et al. | |
| 2009/0199291 A1 | 8/2009 | Hayasaka et al. | |
| 2009/0254990 A1 | 10/2009 | McGee | |
| 2009/0292858 A1 | 11/2009 | Lambeth et al. | |
| 2010/0040063 A1 | 2/2010 | Srinivasan et al. | |
| 2010/0107162 A1 | 4/2010 | Edwards et al. | |
| 2010/0115080 A1* | 5/2010 | Kageyama | H04L 29/12028 709/223 |
| 2010/0115101 A1 | 5/2010 | Lain et al. | |
| 2010/0115606 A1 | 5/2010 | Samovskiy et al. | |
| 2010/0125667 A1 | 5/2010 | Soundararajan | |
| 2010/0131636 A1 | 5/2010 | Suri et al. | |
| 2010/0138830 A1 | 6/2010 | Astete et al. | |
| 2010/0154051 A1 | 6/2010 | Bauer | |
| 2010/0169880 A1 | 7/2010 | Haviv et al. | |
| 2010/0180275 A1 | 7/2010 | Neogi et al. | |
| 2010/0191881 A1 | 7/2010 | Tauter et al. | |
| 2010/0214949 A1 | 8/2010 | Smith et al. | |
| 2010/0223610 A1 | 9/2010 | Dehaan et al. | |
| 2010/0235831 A1 | 9/2010 | Dittmer | |
| 2010/0254385 A1 | 10/2010 | Sharma et al. | |
| 2010/0257263 A1 | 10/2010 | Casado et al. | |
| 2010/0275199 A1 | 10/2010 | Smith et al. | |
| 2010/0281478 A1 | 11/2010 | Sauls et al. | |
| 2010/0306408 A1 | 12/2010 | Greenberg et al. | |
| 2010/0306773 A1 | 12/2010 | Lee et al. | |
| 2010/0329265 A1 | 12/2010 | Lapuh et al. | |
| 2010/0333189 A1 | 12/2010 | Droux et al. | |
| 2011/0022694 A1 | 1/2011 | Dalal et al. | |
| 2011/0022695 A1 | 1/2011 | Dalal et al. | |
| 2011/0023031 A1 | 1/2011 | Bonola et al. | |
| 2011/0026537 A1* | 2/2011 | Kolhi | H04L 12/4633 370/401 |
| 2011/0035494 A1 | 2/2011 | Pandey et al. | |
| 2011/0075664 A1 | 3/2011 | Lambeth et al. | |
| 2011/0110377 A1 | 5/2011 | Alkhatib et al. | |
| 2011/0194567 A1 | 8/2011 | Shen | |
| 2011/0208873 A1 | 8/2011 | Droux et al. | |
| 2011/0299537 A1 | 12/2011 | Saraiya et al. | |
| 2012/0005521 A1 | 1/2012 | Droux et al. | |
| 2012/0110188 A1 | 5/2012 | van Biljon et al. | |
| 2013/0151661 A1* | 6/2013 | Koponen | H04L 47/12 709/217 |
| 2013/0239198 A1* | 9/2013 | Niemi | H04L 63/0272 726/12 |
| 2013/0322436 A1 | 12/2013 | Wijnands et al. | |
| 2014/0052877 A1* | 2/2014 | Mao | H04L 61/103 709/245 |
| 2014/0192804 A1* | 7/2014 | Ghanwani | H04L 49/70 370/390 |
| 2014/0317059 A1 | 10/2014 | Lad et al. | |
| 2015/0106489 A1* | 4/2015 | Duggirala | H04L 61/2503 709/222 |
| 2015/0195137 A1* | 7/2015 | Kashyap | H04L 41/0893 370/254 |
| 2015/0271303 A1* | 9/2015 | Neginhal | H04L 12/46 370/392 |
| 2015/0281060 A1* | 10/2015 | Xiao | H04L 45/74 709/238 |
| 2015/0301846 A1* | 10/2015 | Dalal | H04L 41/0843 718/1 |
| 2015/0334012 A1 | 11/2015 | Butler et al. | |
| 2017/0149664 A1 | 5/2017 | Ganga | |
| 2017/0170988 A1 | 6/2017 | Mazarick | |
| 2017/0272316 A1 | 9/2017 | Johnson et al. | |
| 2017/0272400 A1 | 9/2017 | Bansal et al. | |
| 2017/0300354 A1 | 10/2017 | Dalal et al. | |

(56) References Cited

U.S. PATENT DOCUMENTS

2018/0063193 A1* 3/2018 Chandrashekhar ... H04L 63/062
2019/0007342 A1 1/2019 Wang et al.

FOREIGN PATENT DOCUMENTS

WO     2008098147 A1    8/2008
WO     2015147943 A1    10/2015
WO     2019006042 A1    1/2019

OTHER PUBLICATIONS

Author Unknown, "Introduction to VMware Infrastructure," ESX Server 3.5, ESX Server 3i version 3.5, VirtualCenter 2.5, Dec. 13, 2007, 46 pages, VMware, Inc., Palo Alto, California, USA.
Author Unknown, "iSCSI SAN Configuration Guide," ESX Server 3.5, ESX Server 3i version 3.5, VirtualCenter 2.5, Nov. 29, 2007, 134 pages, VMware, Inc., Palo Alto, California, USA.
Author Unknown, "Virtual Machine Mobility Planning Guide," Oct. 18, 2007, 33 pages, VMware, Inc., Palo Alto, CA, USA.
Author Unknown, "VMware Infrastructure 3 Primer," ESX Server 3.5, ESX Server 3i version 3.5, VirtualCenter 2.5, Nov. 29, 2007, 22 pages, VMware, Inc., Palo Alto, California, USA.
Non-Published commonly owned U.S. Appl. No, 15/640,386, filed Jun. 30, 2017, 35 pages, Nicira, Inc.
International Search Report and Written Opinion of commonly owned International Patent Application PCT/US2018/039873, dated Nov. 9, 2018, 16 pages, International Searching Authority.
Non-Published commonly owned International Patent Application PCT/US2018/039873, filed Jun. 27, 2018, 38 pages, Nicira, Inc.

\* cited by examiner

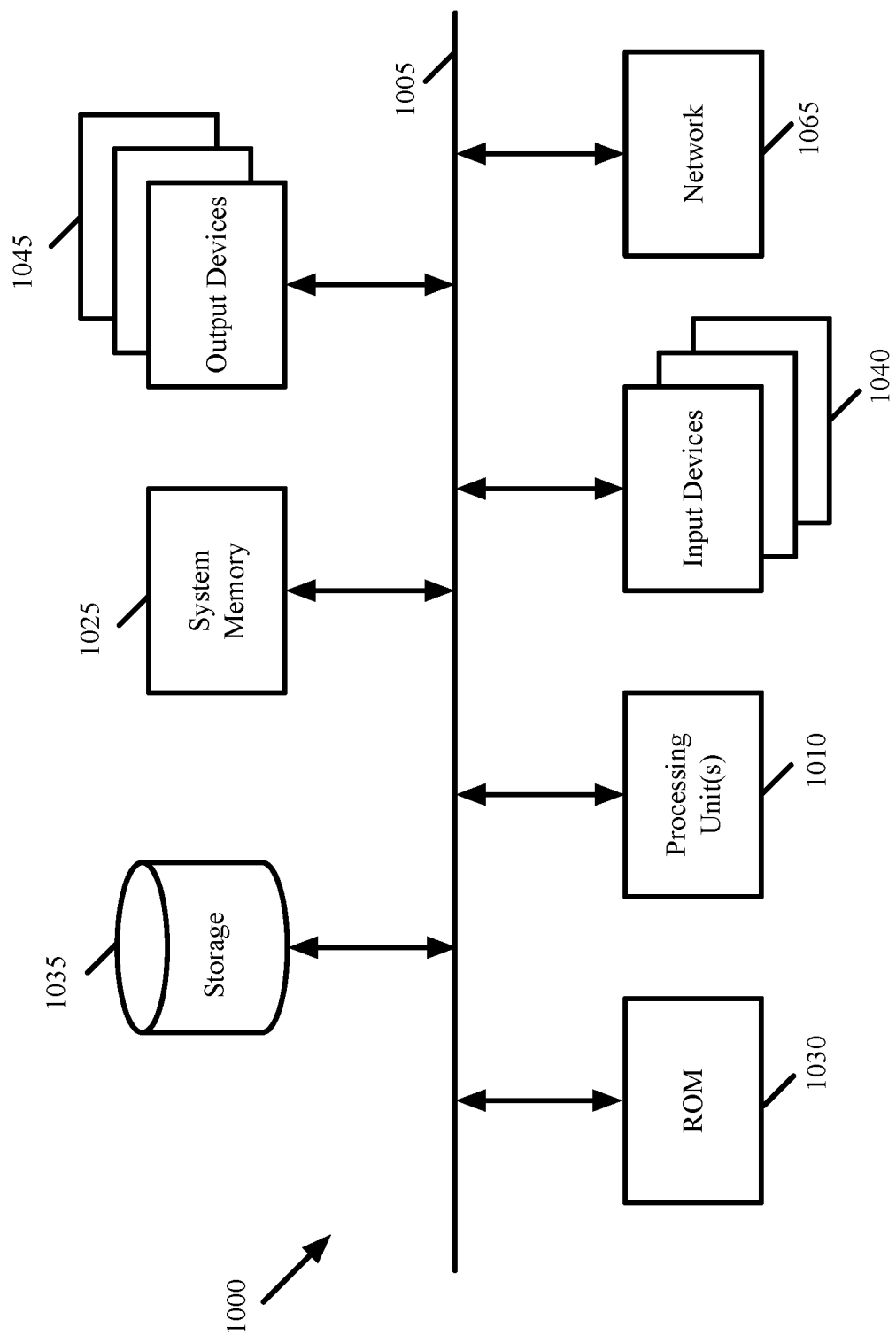

ASSIGNMENT OF UNIQUE PHYSICAL NETWORK ADDRESSES FOR LOGICAL NETWORK ADDRESSES

BACKGROUND

Network virtualization plays a crucial role in the operation of datacenters, with two different approaches generally used to achieve network virtualization. In the overlay approach, the physical datacenter network is used as a packet carrier, and the network functionalities (of the logical networks) are separated and implemented in the upper overlaying layer. A common technique is to embed logical L2 (data link layer) packets in physical L3 (network layer) packets. In the underlay approach, the physical network devices (e.g., switches, routers) are programmed based on the logical network model, so that the physical datacenter network acts as both the packet carrier and logical network provider.

Using overlays provides flexibility, but the network stack includes five layers rather than three for IP networking. The extra protocol layers consume extra physical network bandwidth, which means less bandwidth is available for the actual payload. In addition, the packet encapsulation and resulting fragmentation and checksum calculation use extra CPU cycles, which otherwise would be available for guest workloads (e.g., virtual machines). As such, other techniques for network virtualization would be useful.

BRIEF SUMMARY

Some embodiments provide a method for implementing multiple logical networks in a physical network without using encapsulation, and without the physical network being required to perform logical network services and processes. Instead, some embodiments map each logical network address to a unique physical network address, and use address replacement on logical network packets rather than encapsulation.

In some embodiments, a network controller (or cluster of network controllers) maintains a pool of available physical network addresses, and handles requests from managed forwarding elements (MFEs) to assign unique physical addresses to logical network addresses for interfaces that connect to the MFEs. For example, when an interface (e.g., a virtual network interface controller (VNIC)) of a virtual machine (VM) or other data compute node (DCN) corresponding to a logical port of a logical forwarding element attaches to a MFE, that interface is assigned a logical network address. This assignment may be via dynamic host configuration protocol (DHCP), statically assigned or otherwise pre-configured, etc. The MFE notifies the network controller of the new logical network address.

The network controller receives this notification with the logical network address and assigns a unique physical network address for the interface (i.e., mapped to the logical network address). The network controller provides this physical network address to the requesting MFE, and stores the mapping between logical network address (and interface) and physical network address. In some embodiments, based on its network topology information, the network controller distributes the mapping to other MFEs that could potentially be sending packets to (or receiving packets from) the logical network address, and would thus need the physical mapping. In other embodiments, when a different MFE receives a first packet sent to the logical network address (e.g., from one of its local DCNs) or from the physical network address, that MFE sends a request to the controller for the mapping. The controller notifies the MFE regarding the mapping so that the MFE can use the mapping to process packets, as described further below.

In some embodiments, each physical network address is not just unique within a particular logical network, but is unique among all logical interfaces for all logical networks implemented within the physical network. That is, while logical address spaces may overlap between separate logical networks (i.e., the same subnet and/or IP address could be used in multiple logical networks), the physical network uses a single network address space. In a typical datacenter, this physical address space is allocated privately (i.e., does not need to be used or known outside of the datacenter), and thus the available address space is fairly large.

To process a packet at the source MFE (i.e., the MFE that sends the packet onto the physical network, which is often the MFE that first receives the packet from its source DCN), the source MFE first performs logical network processing. This processing may include logically forwarding the packet through one or more logical forwarding elements (e.g., a logical switch, a logical router, and another logical switch), performing logical ACL and distributed firewall checks, etc. If the packet is routed, the time to live and logical MAC address may be changed.

Once this logical processing is complete, a typical overlay network would encapsulate the packet based on its destination address being mapped to a physical tunnel endpoint address. However, in some embodiments, the MFE determines whether the packet is eligible for address replacement instead of encapsulation. In some embodiments, only unicast packets sent between logical network addresses are eligible for address replacement. That is, multicast/broadcast packets, and packets sent to (or received from) a destination outside of the logical network are not eligible for address replacement. Assuming that the packet is eligible (and the MFE has the mapping information for the source and destination addresses), the source MFE replaces the logical source and destination network (e.g., IP) addresses in the packet with the unique physical addresses to which they are mapped. Some embodiments also modify the source and destination data link (e.g., MAC) addresses with those that would be used for an encapsulated packet (e.g., a source MAC corresponding to the physical interface of the MFE and a destination MAC corresponding to the physical network next hop).

In addition, a logical interface might send a packet that could cause the physical network routers to perform various unwanted actions when using address replacement (e.g., an ICMP packet). Whereas an encapsulated packet would have this information hidden in the inner header (being encapsulated with, e.g., a TCP or UDP packet), with address replacement the physical network would see this protocol and potentially act upon it. Thus, for certain protocols, the source MFE replaces the protocol header field value with an unused or reserved protocol value that (i) would not cause the physical network to take any unwanted action and (ii) should not be used within the logical network.

The packet is then processed through the physical network as normal. Once the packet reaches the destination MFE, additional processing is required to handle the non-encapsulated packet. The destination MFE maps the protocol field value to its original value, if needed (i.e., if the protocol value is one of the unused or reserved values to which a different value was mapped at the source MFE). The physical network addresses are also replaced with the logical network addresses based on the mappings stored by the MFE. To determine the logical data link addresses, some embodiments use the network topology. If the source and destination network addresses are on the same logical switch, then the data link addresses will be those of the corresponding logical interfaces. However, if the source network address is on a different logical switch from the destination, then the data link address of the logical router interface that connects to the logical switch will be the source data link address. Once the data link layer address is also replaced, the MFE can perform any additional required logical processing and deliver the packet to the destination interface.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

FIG. 10 conceptually illustrates an electronic system with which some embodiments of the invention are implemented.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a method for implementing multiple logical networks in a physical network without using encapsulation, and without the physical network being required to perform logical network services and processes. Instead, some embodiments map each logical network address to a unique physical network address, and use address replacement on logical network packets rather than encapsulation.

In some embodiments, a network controller (or cluster of network controllers) maintains a pool of available physical network addresses, and handles requests from managed forwarding elements (MFEs) to assign unique physical addresses to logical network addresses for interfaces that connect to the MFEs. For example, when an interface (e.g., a virtual network interface controller (VNIC)) of a virtual machine (VM) or other data compute node (DCN) corresponding to a logical port of a logical forwarding element attaches to a MFE, that interface is assigned a logical network address.

Figure 1:
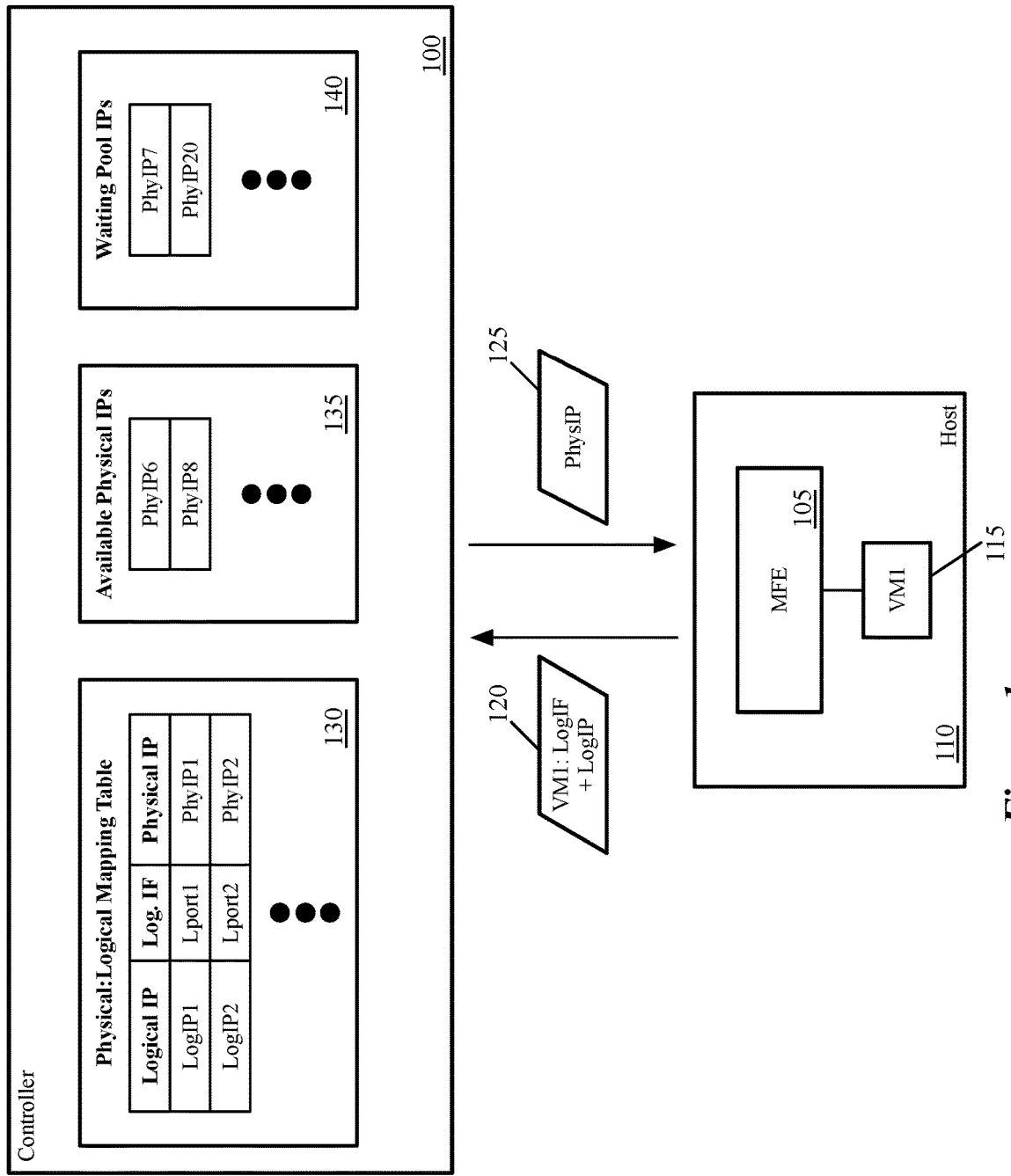
FIG. 1 conceptually illustrates a network controller and its communication with an MFE to provide the MFE with a physical IP address for a newly connected interface.

FIG. 1 conceptually illustrates such a network controller 100 and its communication with an MFE 105 to provide the MFE 105 with a physical IP address for a newly connected interface. It should be understood that while a single central network controller 100 is shown, in some embodiments a cluster of such controllers operates to communicate with numerous MFEs on numerous host machines.

As shown, the MFE 105 operates on a host 110, and at least one DCN (in this case a VM 115) attaches to the MFE 105. The MFE 105, in some embodiments, is a virtual switch or other software forwarding element that operates in the virtualization software (e.g., hypervisor) of the host machine 110, and which is configured by a network control system that includes the network controller 100. In some embodiments, a local controller operates on the host machine 110 (e.g., also within the virtualization software). This local controller receives configuration data from the network controller 100 and translates the configuration data from the network controller 100 for the MFE 105. In some such embodiments, the communication between the MFE 105 and the controller 100 is sent through the local controller.

The VM 115 attaches to the MFE 105 via a VNIC or similar interface. When a VNIC attaches to the network, it will be assigned a logical network address. In the subsequent discussion, Internet Protocol (IP) addresses will be used, but it should be understood that these addresses could be other types of network layer addresses in different embodiments. A logical IP address is the address that the VNIC uses to send/receive traffic on a logical network. As described further below, multiple distinct logical networks may be implemented within a single physical datacenter network, with each logical network having its own address space (which can overlap with the address spaces of other logical networks). The MFEs implement the logical networks based on the configuration data received from the network controllers.

The assignment of an IP address may be accomplished via dynamic host configuration protocol (DHCP), static assignment, other pre-configuration of the IP, etc. When the MFE 105 identifies the logical IP address of a new interface (by intercepting a DHCP packet, receiving the information from the VNIC, processing a packet from the VNIC, etc.), the MFE 105 notifies the network controller 100 of the new logical network address and interface, so that the network controller 100 can assign a unique physical IP address for the interface (i.e., mapped to the logical network address).

Figure 2:
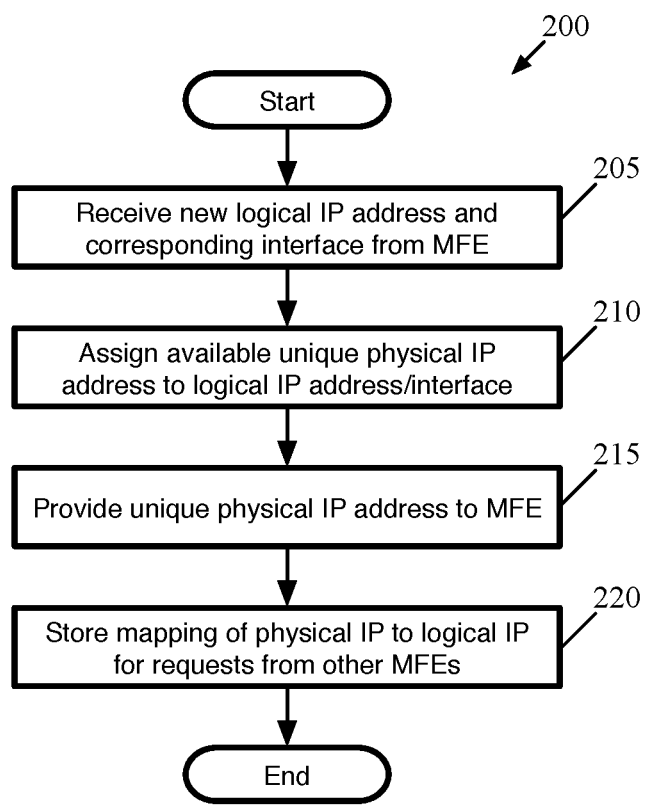
FIG. 2 conceptually illustrates a process of some embodiments for assigning a physical IP address to map to a logical IP address.

FIG. 2 conceptually illustrates a process 200 of some embodiments for assigning a physical IP address to map to a logical IP address. The process 200 is performed by a network controller (e.g., the controller 100) in response to receiving a request from an MFE (e.g., the MFE 105) for a physical IP address.

As shown, the process 200 begins by receiving (at 205) a new logical IP address and a corresponding interface from an MFE. Because the logical IP address is not necessarily exclusive to the logical network, an additional identifier is required for the mapping. Some embodiments use a unique VNIC identifier or a unique logical port identifier. FIG. 1 illustrates that the MFE 105 sends a message 120 to the network controller 100 with the interface and logical IP address of the VNIC by which the VM 115 connects to the MFE 105. As mentioned, the MFE may have become aware of this after a DHCP request, when a first packet is sent by the VM 115, etc. In some embodiments, the message 120 from the MFE only needs to identify the presence of the logical interface on the host 110, as the controller 100 already has the corresponding logical IP address that has been assigned to the interface.

The process 200, in response to this request, assigns (at 210) an available unique physical IP address to the logical IP address/interface combination. In some embodiments, each physical network address is not just unique within a particular logical network, but is unique among all logical interfaces for all logical networks implemented within the physical network. That is, while logical address spaces may overlap between separate logical networks (i.e., the same subnet and/or IP address could be used in multiple logical networks), the physical network uses a single network address space. In a typical datacenter, this physical address space is allocated privately (i.e., does not need to be used or known outside of the datacenter), and thus the available address space is fairly large. In some embodiments, the datacenter may use both IPv4 and IPv6 addresses. In such embodiments, these addresses are allocated separately. That is, when a logical IPv4 address is sent to the controller 100, the controller 100 allocates a unique physical IPv4 address, and when a logical IPv6 address is sent to the controller 100, the controller 100 allocates a unique physical IPv6 address.

The process 200 then provides (at 215) the assigned unique physical IP address to the requesting MFE. As shown in FIG. 1, the network controller 100 sends a message 125 with the assigned physical IP address to the MFE 100. As noted, in some embodiments this message is sent to a local controller on the host 100, which in turn provides the data to the MFE 105. The MFE 105 stores this mapping, and uses the mapping to process packets sent to and from the VM 115, as described in more detail below. In some embodiments, the MFE sends a gratuitous ARP packet to notify the physical network of the new IP address.

The process 200 also stores (at 220) the mapping of logical IP address and interface to the physical IP address. As shown in FIG. 1, the network controller 100 stores a physical to logical network address mapping table 130, as well a pool of available IP addresses 135 and a waiting pool of IP addresses 140. The network controller 100 stores this mapping table (which, in some embodiments, also identifies the host machine for each logical IP address and interface combination) in order to distribute the mappings to other MFEs that need the data. In some embodiments, based on its network topology information, the network controller distributes the mapping to other MFEs that could potentially be sending packets to (or receiving packets from) the logical network address, and would thus need the physical mapping. In other embodiments, when a different MFE receives a first packet sent to the logical network address (e.g., from one of its local DCNs) or from the physical network address, that MFE sends a request to the controller 100 for the mapping. The controller 100 notifies the MFE regarding the mapping so that the MFE can use the mapping to process packets, as described further below.

As noted, the network controller 135 also includes a pool 135 of available physical IP addresses and a waiting pool 140 of physical IP addresses. The physical IP addresses, as described above, are unique within a datacenter (or other privately-allocated physical network). Thus, the available physical IP addresses pool 135 lists all of the IP addresses available to be used for mapping—i.e., the physical IP addresses that are not currently mapped to a logical IP address of an operating interface. Once the network controller 100 assigns a particular physical IP address to an interface, the controller 100 stores this mapping in the table 130 and removes the physical IP address from the pool 135 of available IPs.

Figure 3:
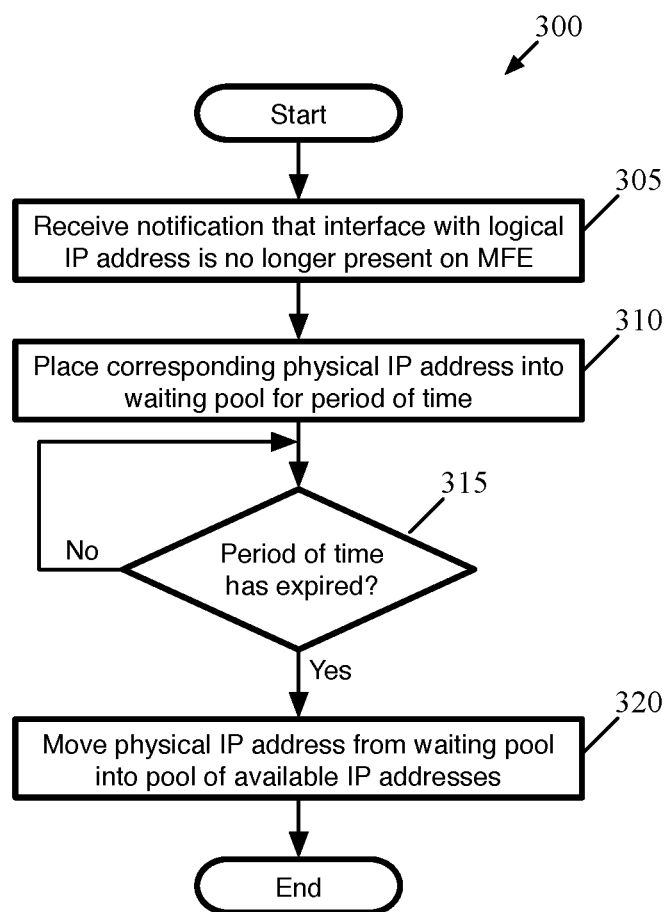
FIG. 3 conceptually illustrates a process of some embodiments for releasing an assigned physical IP address when a logical interface is moved or released.

FIG. 3 conceptually illustrates a process 300 of some embodiments for releasing an assigned physical IP address when a logical interface is moved or released. The process 300 is performed by a network controller (e.g., the controller 100) in response to receiving a notification from an MFE (e.g., the MFE 105) that a logical interface is no longer in use.

As shown, the process 300 begins by receiving (at 305) from an MFE (or a local controller operating on a host with an MFE) a notification that an interface with a logical IP address is no longer present on the MFE. If a VM is migrated to a different host, some embodiments release the physical IP and reassign a new one; other embodiments keep the same logical IP to physical IP mapping. Other circumstances that could cause a logical IP address to no longer be present on an MFE are the removal of that interface from its logical network (i.e., by an administrator changing the logical network configuration), or the logical IP is changed (e.g., also by a change to the logical network configuration).

In response, the process 300 places (at 310) the physical IP address corresponding to the released logical IP address in a waiting pool for a threshold period of time. As indicated, the network controller 100 includes a waiting pool 140 for physical IP addresses. The waiting pool 140 is used to ensure that a physical IP address is not reallocated too quickly after being released, giving the network time to flush packets that may be sent to the previous interface to which the physical IP address is mapped.

Thus, the process determines (at 315) whether the period of time has expired. If not, the process continues to evaluate this until the period of time expires. It should be understood that the process 200 (as well as the other processes described herein) is a conceptual process, and that some embodiments do not perform continuous checks for each physical IP address in the waiting pool 140. Instead, some embodiments use an event-driven process that simply waits and then takes action upon the waiting period expiring. Once the period of time has expired, the process 300 moves (at 320) the physical address from the waiting pool into the pool of available physical IP addresses. That is, the network controller 100 moves the IP address from the waiting pool 140 to the available IP address pool 135.

Figure 4:
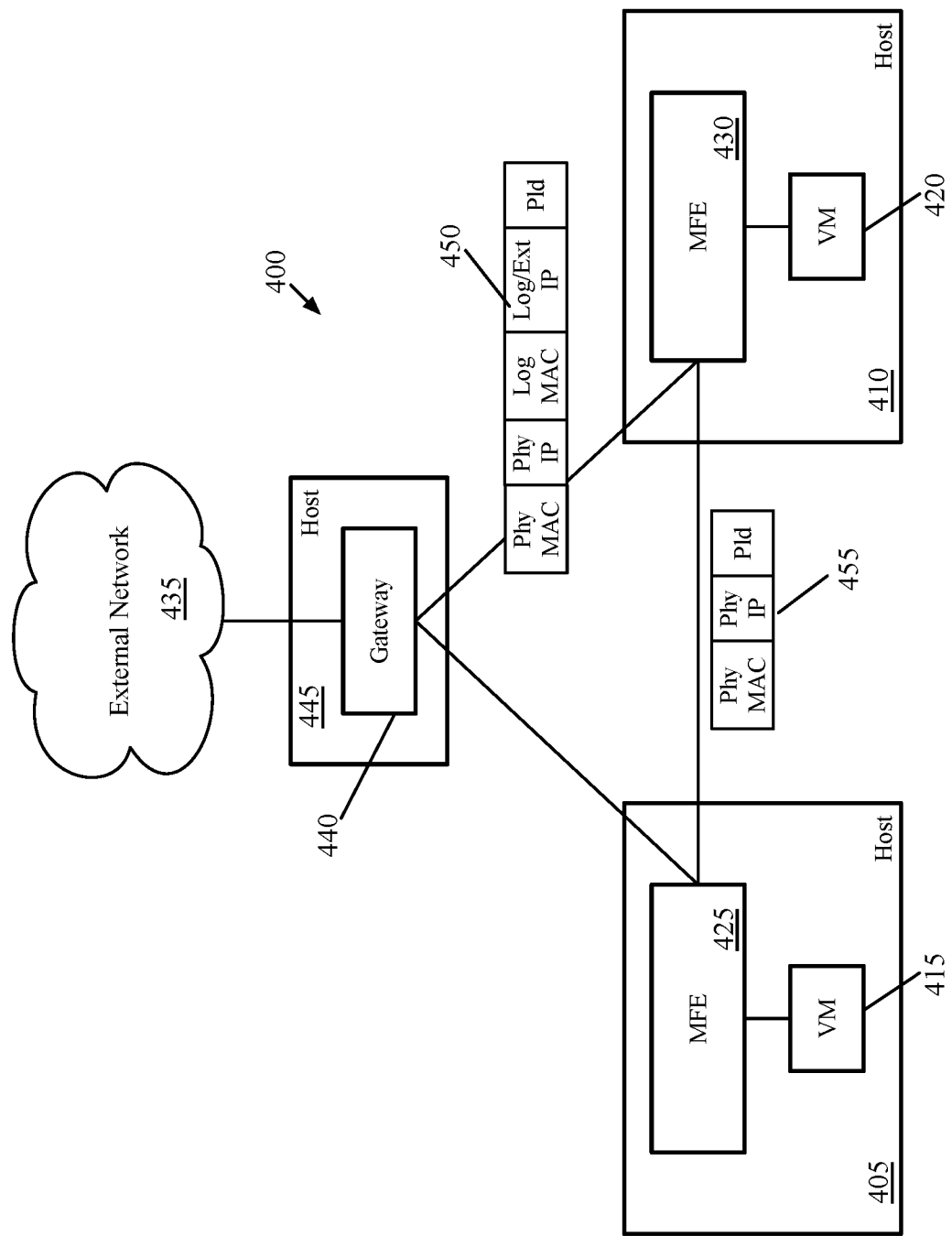
FIG. 4 conceptually illustrates a set of MFEs that implement at least one logical network within a datacenter network of some embodiments, and the difference in physical network traffic between two logical network endpoints (e.g., VMs) and physical network traffic between a logical network endpoint and an external network.

The above description relates to the network controller operations to assign and manage the logical to physical IP address mappings. Once these mappings are assigned, packets are sent between MFEs without encapsulation (at least for certain packets that meet certain criteria). FIG. 4 conceptually illustrates a set of MFEs that implement at least one logical network within a datacenter network 400 of some embodiments. Specifically, this figure illustrates the difference in physical network traffic between two logical network endpoints (e.g., VMs) and physical network traffic between a logical network endpoint and an external network.

As shown, the datacenter 400 includes two host machines 405 and 410 that host VMs, which belong to the same logical network (they may attach to the same logical switch or different logical switches). The VMs 415 and 420 connect to MFEs 425 and 430, respectively, which operate on the host machines 405 and 410 to implement the logical network. In addition, the logical network to which the VMs 415 and 420 belong includes a connection (e.g., a logical router connection) to an external network 435. This connection is implemented by a gateway 440 operating on a third host machine 445. In some embodiments, the gateway 440 is a separate component of a logical router, and may be implemented in a VM or other DCN on the host 445, in the datapath of the host 445, etc.

When the VM 420 (or the VM 415) sends traffic to the external network 435 or receives traffic from this external network, the traffic between the gateway 440 and the MFE 430 is encapsulated with the physical IP addresses. As shown by the packet 450, this traffic includes inner IP and Ethernet headers as well as outer (encapsulation) IP and Ethernet headers. For the sake of simplicity, the other inner and outer protocols (e.g., transport protocols) are not shown here. Because the external IP address will not have a mapping to a unique IP address, if the MFE or gateway were to replace this IP in the packet (e.g., with the IP address of a PNIC of the host 445), the receiving WE/gateway would not be able to map this back to the correct IP address. Instead, encapsulation is used for this communication between logical network endpoints and the external network in order to preserve these addresses.

On the other hand, when the VM 415 sends a packet to the VM 420 (or vice versa), the MFE 425 performs address replacement to replace the logical IP (and logical MAC) addresses with physical IP and MAC addresses, as indicated by the packet 455. This packet 455 has fewer headers and thus more room for payload without fragmentation if the network is constrained by a maximum transmission size. Address replacement is available for the packet 455 because the traffic is unicast communication between two logical network endpoints that have one-to-one mappings with physical IP addresses. In some embodiments, the MFEs do not use address replacement for multicast/broadcast communications, because the packets are sent to multiple physical destinations. However, in other embodiments, at least some multicast/broadcast packets are replicated into unicast packets by the MFE (e.g., a separate unicast packet for each destination, each packet having a different destination address), and these unicast packets can be sent onto the physical network using address replacement rather than encapsulation.

Figure 5:
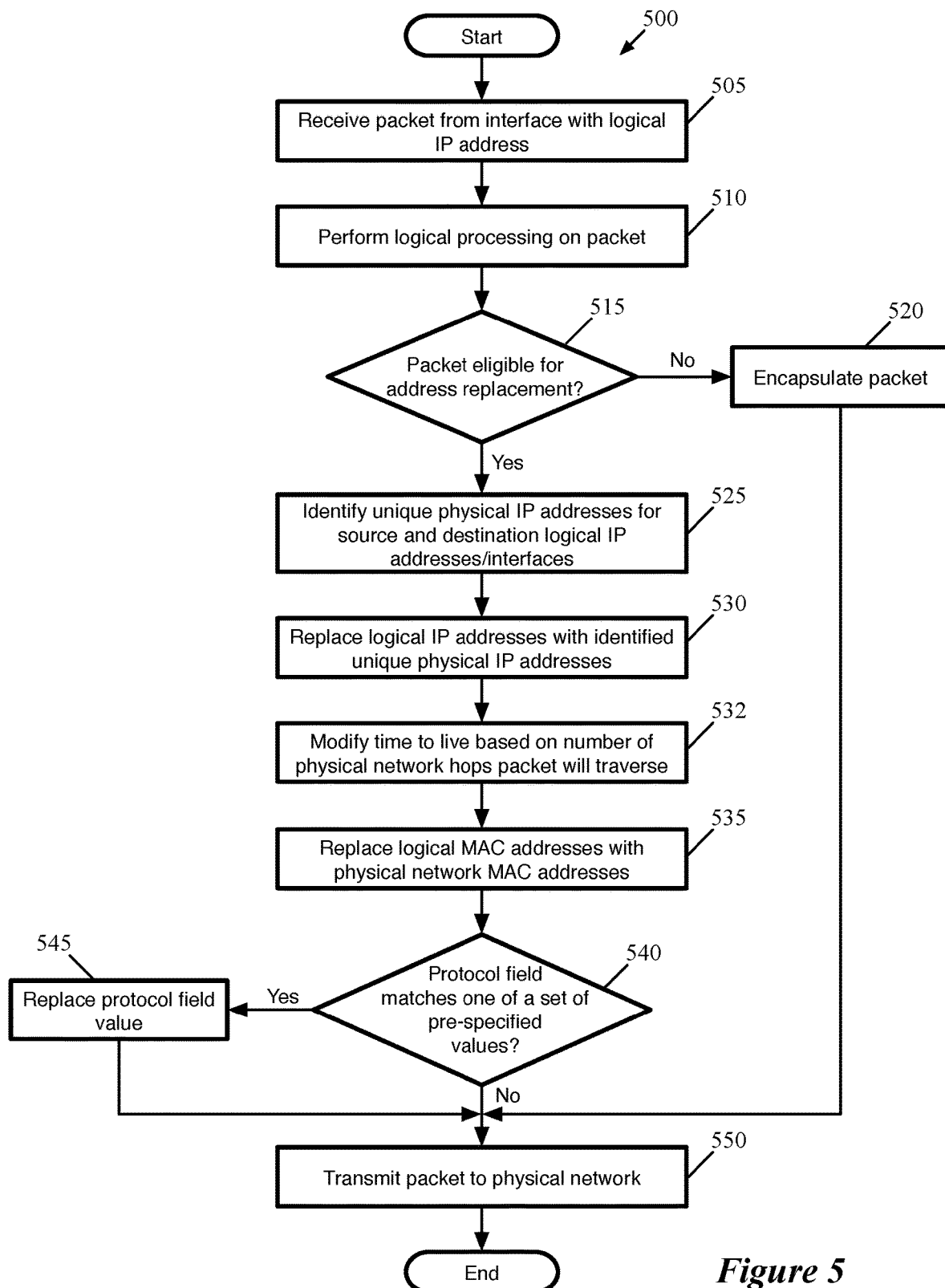
FIG. 5 conceptually illustrates a process of some embodiments for replacing logical IP addresses with physical IP addresses.
Figure 6:
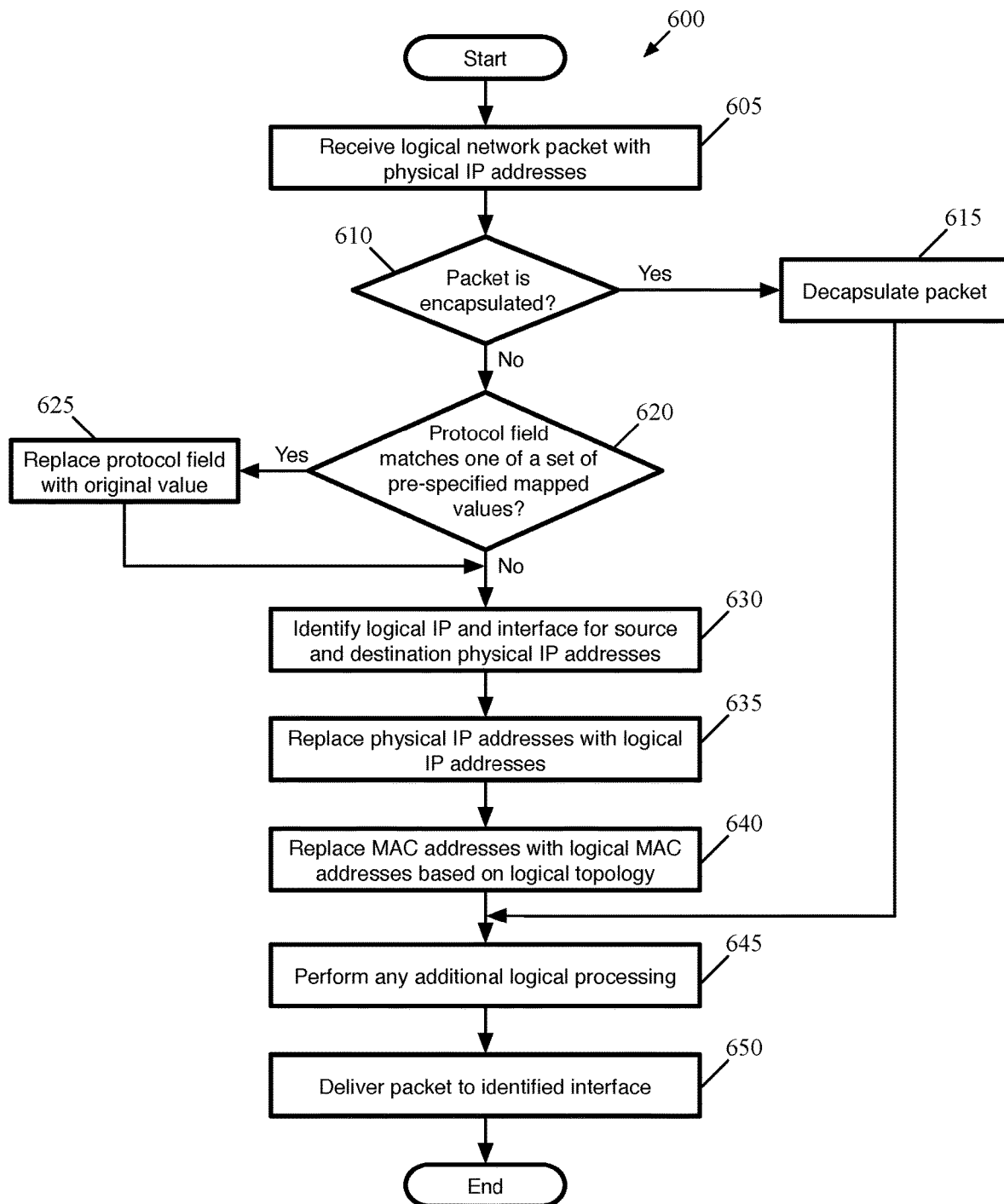
FIG. 6 conceptually illustrates a process of some embodiments for replacing physical IP addresses with logical IP addresses before delivering a packet to an interface.

FIGS. 5 and 6 describe processes performed by a source MFE (i.e., the first-hop WE for a packet) and a destination MFE (the recipient of such a packet via the physical network) to perform address replacement on a packet. These processes assume that the MFEs performing the respective processes have the logical IP to physical IP mapping information, and do not need to request this information from a network controller in order to process the packet.

Figure 7:
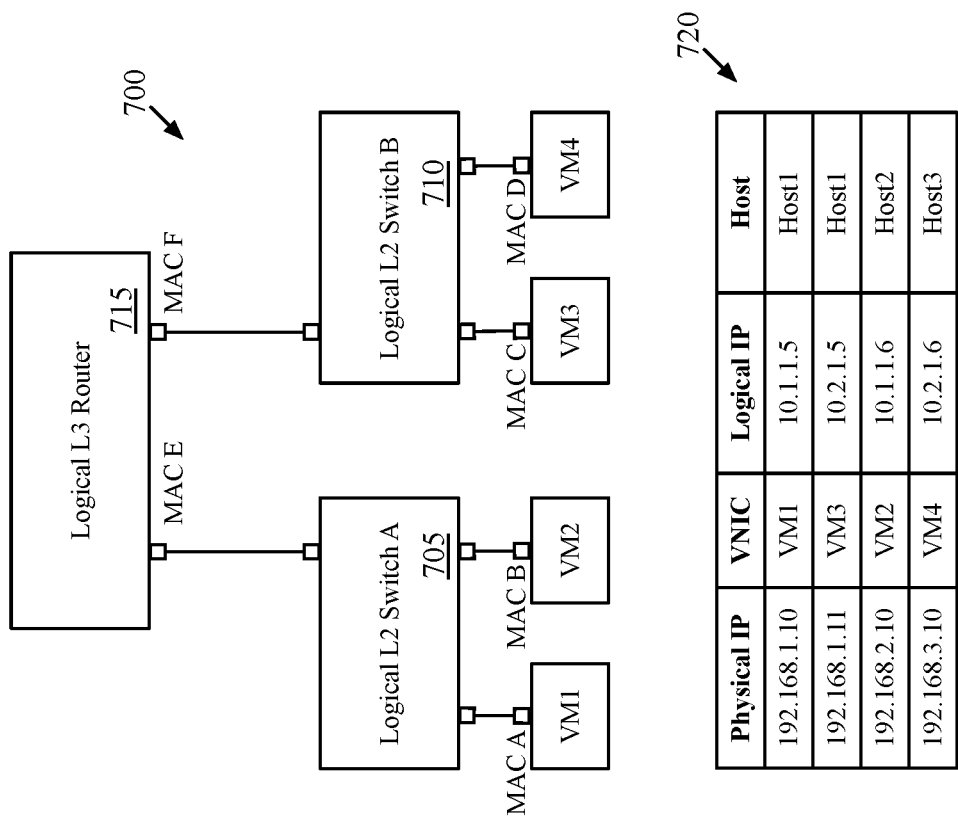
FIG. 7 conceptually illustrates a logical network and the logical to physical IP address mappings assigned for the endpoints of that network.
Figure 8:
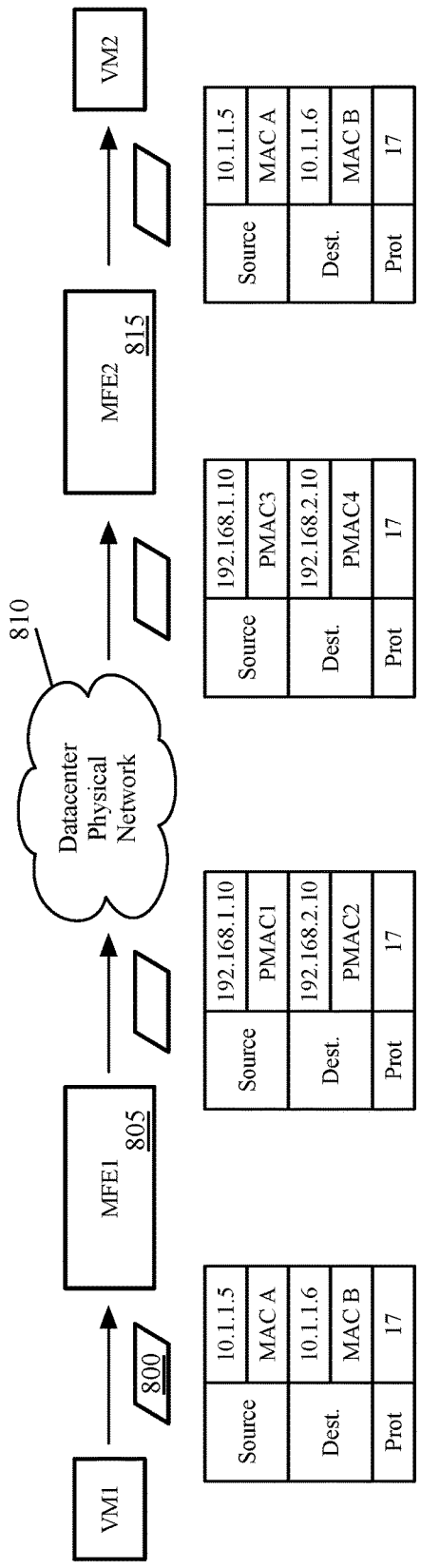
FIGS. 8 and 9 illustrate examples of packets sent through the physical implementation of that logical network.
Figure 9:
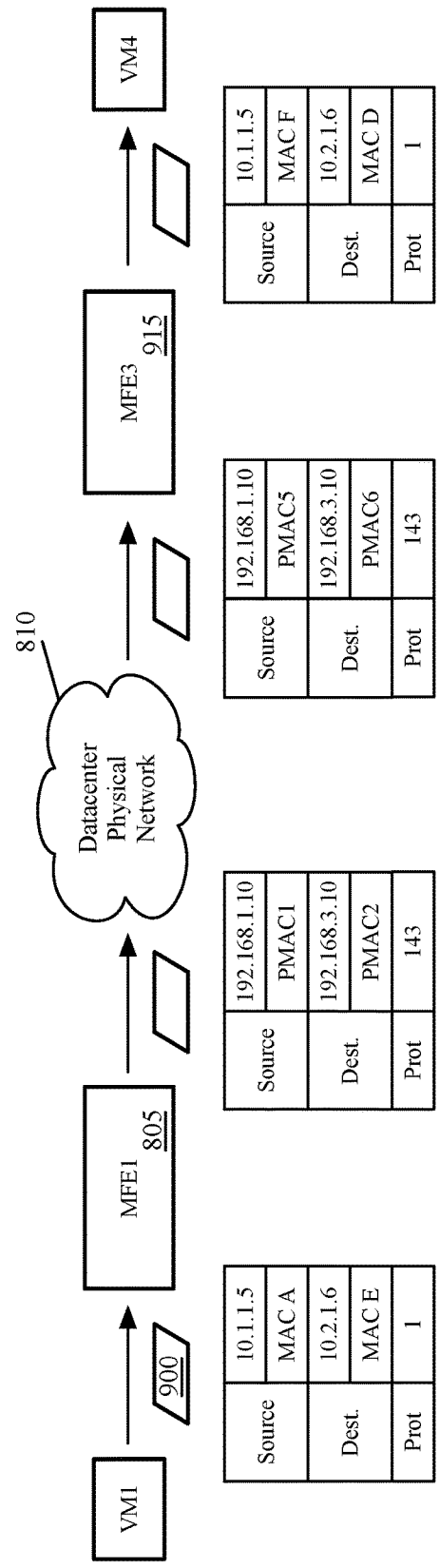

The processes of FIGS. 5 and 6 will be described in part by reference to FIGS. 7-9. FIG. 7 conceptually illustrates a logical network 700 and the logical to physical IP address mappings assigned for the endpoints of that network, while FIGS. 8 and 9 illustrate examples of packets sent through the physical implementation of that logical network. The logical network 700 includes two logical switches 705 and 710 that are logically connected by a logical router 715. Two VMs (VM1 and VM2) connect to the first logical switch 705 and two VMs (VM3 and VM4) connect to the second logical switch 710. Each of these logical interfaces has a MAC address (MAC A, MAC B, MAC C, and MAC D). In addition, the logical router downlinks (interfaces to the logical switches) have their own logical MAC addresses (MAC E and MAC F).

The logical to physical IP address mapping table 720 is information that would be stored by a network controller (or network controller cluster), as well as the MFEs that implement the logical network. As shown in this table, the VMs are implemented on three hosts, and thus the three MFEs operating on these hosts would store the information in the mapping table 720. VM1 and VM3 are implemented on a first host, with VM2 on a second host and VM4 on a third host. The first logical switch 705 is assigned a subnet 10.1.1.0/24, and the logical IP addresses of the two VMs on this subnet are 10.1.1.5 and 10.1.1.6. Similarly, the second logical switch 710 is assigned a subnet 10.2.1.0/24, and the logical IP addresses of the two VMs on this subnet are 10.2.1.5 and 10.2.1.6. According to the mapping table 720, each of these logical interfaces maps to a unique physical IP address. While this example shows only a single logical network, if other logical networks were implemented on the hosts (or even on some of the hosts), those hosts would also map the logical IP addresses of the additional logical networks to unique physical IP addresses. A single host could, for example, have numerous mappings for the logical IP address 10.1.1.5, to different physical IP addresses for different interfaces of different logical networks.

FIG. 5 conceptually illustrates a process 500 of some embodiments for replacing logical IP addresses with physical IP addresses. In some embodiments, the source MFE for a packet (i.e., the MFE to which the source interface for the packet connects) performs this process 500 on the packet upon receiving the packet (e.g., from a VNIC).

As shown, the process 500 begins by receiving (at 505) a packet from an interface with a logical IP address. The packet, as sent, will have logical source and destination IP addresses as well as logical source and destination MAC addresses. The source addresses are those of the interface from which the packet was received (e.g., the VNIC or similar interface) by the MFE. The destination IP address is the address of the ultimate destination for the packet, while the MAC address is either that of the destination (if the destination is on the same logical switch) or of the local logical gateway (if the packet requires logical routing).

FIGS. 8 and 9 illustrate examples of such packets as they are sent through the physical network. In FIG. 8, VM1 sends a packet 800 to VM2 (on the same logical switch, but operating in a different physical host machine). The packet 900, as sent to an MFE 805, has a source IP address of 10.1.1.5, a destination IP address of 10.1.1.6, a source MAC address of MAC A, and a destination MAC address of MAC B. In addition, the protocol field of the IP header has the value 17 (for User Datagram Protocol (UDP)). In FIG. 9, VM1 sends a packet 900 to VM4 (on a different logical switch and operating in a different physical host machine). The packet 900, as sent to the MFE 805, has a source IP address of 10.1.1.5, a destination IP address of 10.2.1.6, a source MAC address of MAC A, and a destination MAC address of MAC E (corresponding to the default gateway for VM1). In addition, the protocol field of the IP header has the value 1 (for Internet Control Message Protocol (ICMP)).

Returning to FIG. 5, the process 500 performs (at 510) logical processing on the received packet. That is, the MFE processes the packet through the logical network, which may include application of ACL and firewall (e.g., distributed firewall) rules, network address translation (NAT) processing, distributed load balancing, etc. The logical processing also includes logical switching and/or routing. If logical routing is required (e.g., for the packet 900 of FIG. 9), the logical MAC address is modified and the time to live (TTL) is decremented for the packet.

After logical processing is completed, the process 500 determines (at 515) whether the packet is eligible for address replacement. In some embodiments, only unicast packets sent between logical network addresses are eligible for address replacement. That is, multicast/broadcast packets, and packets sent to (or received from) a destination outside of the logical network are not eligible for address replacement. Because the logical IP addresses are no longer in the packet at all when address replacement is used, some embodiments only use the technique when there is a 1:1 mapping between the logical IP addresses being replaced and the physical IP addresses that replace them.

In the case of broadcast/multicast, the MFEs do not use address replacement because the packets are sent to multiple physical destinations. However, in other embodiments, at least some multicast/broadcast traffic is replicated into multiple unicast packets by the MFE, and these unicast packets can be sent onto the physical network using address replacement rather than encapsulation. For packets sent to/from the external network, using address replacement would require assigning unique physical IP addresses for every external IP address that communicated with the logical network(s). Given the large number of such IP addresses and that the nature of the communication is more likely to be transient, there is likely to be less value in such local physical IP address assignment.

If the packet is not eligible for address replacement (e.g., the packet is a multi-recipient packet, or is addressed to or received from an external IP address that is not a logical network endpoint), the process 500 encapsulates (at 520) the packet. For the encapsulation headers, some embodiments use tunnel endpoint IP addresses that are on the physical network but separate from the unique physical IP addresses used for address replacement. The process 500 then proceeds to 550, described below.

On the other hand, when the packet is eligible for address replacement, the process identifies (at 525) the unique physical IP addresses for the source and destination logical IP addresses and interfaces. The source MFE identifies the logical IP addresses based on the data in the packet header fields, and the source interface based on the interface from which the packet is received. The destination logical interface is identified by the MFE during the logical processing operations (e.g., during logical forwarding).

The MFE consults its IP address mapping table to identify the physical IP addresses. In some embodiments, if the MFE does not have a unique physical IP address stored for the destination logical IP address and interface (or the source, if this is the initial packet from the source interface), the MFE sends a message to the network controller requesting the unique physical IP address. In some embodiments (not shown in this process), rather than wait for the controller, the first packet (or first several packets) are encapsulated rather than sent using address replacement, until the MFE receives the corresponding physical IP address from the network controller.

Assuming that the physical IP addresses are identified, however, the process 500 replaces (at 530) the logical IP addresses in the packet with the identified unique physical IP addresses. In addition, the process modifies (at 532) the time to live (TTL) field of the packet to account for the number of physical network hops the packet will traverse (each of which will decrement the TTL field). In some embodiments, the TTL field should only be decremented by logical processing (for each logical router that processes the packet). The physical datacenter network will often be stable with respect to the number of physical hops between two physical endpoints (when a logical network interface is migrated, this could change the number of physical network hops, but the interface will be assigned a new unique physical network address at this point). Some embodiments use probe messages or other techniques to determine the number of hops to each possible destination physical IP address, and store this information in the mapping tables (e.g., as another column in the table 720).

The process 500 also replaces (at 535) the logical MAC addresses with physical network MAC addresses. The source MAC is that of the physical interface to which the source physical IP address corresponds, while the destination MAC is that of the local gateway (unless the destination physical interface is on the same physical switch as the source physical interface).

FIG. 8 illustrates that the packet sent by the source MFE 805 has the source and destination physical IP addresses that have replaced. The source and destination IP addresses are replaced with the unique physical IP addresses shown in the mapping table 720 as corresponding to 10.1.1.5 (VM1) and 10.1.1.6 (VM2). For the physical MAC addresses, the source MAC (PMAC1) is that of the PNIC to which the 192.168.1.10 address corresponds, while the destination MAC (PMAC2) is that of the local default gateway. FIG. 9 illustrates similar address replacement of the source and destination IP and MAC addresses for the packet 900. The same source physical IP address is used, while the destination IP address corresponding to 10.2.1.6 (VM4) is used. In this case, the same physical MAC addresses are used as for the first packet, because the packet is again sent to the local default gateway on the physical network.

In addition to replacing the logical addresses with physical addresses, the process 500 also determines (at 540) whether the protocol field of the IP header matches one of a set of pre-specified values. When the protocol field does match one of these pre-specified values, the process replaces (at 445) the protocol field value with a replacement value. A logical interface (i.e., the DCN to which the logical interface belongs) might send a packet that could cause the physical network routers to perform various unwanted actions when using address replacement (e.g., an ICMP packet). Whereas an encapsulated packet would have this information hidden in the inner header (being encapsulated with, e.g., a TCP or UDP packet), with address replacement the physical network would see this protocol and potentially act upon it. Thus, for certain protocols, the source MFE replaces the protocol header field value with an unused or reserved protocol value that (i) would not cause the physical network to take any unwanted action and (ii) should not be used within the logical network.

For example, the packet 800 of FIG. 8 has the protocol field value 17, which corresponds to UDP. As UDP packets will be forwarded normally by the routers of the physical network, this protocol field value is not modified by the MFE 805. On the other hand, the packet 900 of FIG. 9 has the protocol field value 1, which corresponds to ICMP. ICMP packets may be acted upon by the physical routers in ways that are not desired, so the MFE 805 replaces this with the value 143, which is a reserved value that will be ignored by the physical network routers.

Finally, whether the packet is encapsulated or has address replacement performed, the process transmits (at 550) the packet to the physical network (i.e., the physical datacenter network 810). The packet is then processed through the physical network as normal, during which the physical MAC addresses may be modified.

FIG. 6 conceptually illustrates a process 600 of some embodiments for replacing physical IP addresses with logical IP addresses before delivering a packet to an interface. In some embodiments, the destination MFE for a packet (i.e., the MFE to which the destination interface for the packet connects) performs the process 600 on the packet upon receiving the packet from the physical datacenter network.

As shown, the process 600 begins by receiving (at 605) a logical network packet with physical IP addresses. The packet, as received, will have physical IP addresses that may correspond to logical interfaces or that may be tunnel endpoint addresses in an encapsulation header. These physical IP addresses, in some embodiments, are the IP addresses either added as encapsulation headers or replaced in the packet by the source MFE (e.g., using a process such as that shown in FIG. 5). In FIG. 8, the packet 800 has the same source and destination physical IP addresses when received by the destination MFE 815 as when sent by the source MFE 805, though different physical MAC addresses owing to the routing through the physical datacenter network 810. The same is true in the example shown in FIG. 9.

Thus, the process 600 determines (at 610) whether the packet is encapsulated. In some embodiments, the IP addresses will be different for encapsulated packets as compared to non-encapsulated packets. Specifically, if the source and destination IP addresses correspond to tunnel endpoints of the source and destination MFEs, then the packet is encapsulated. On the other hand, if the source and destination IP addresses are unique physical IP addresses in the logical to physical IP address mapping table of the MFE, then the packet was sent using address replacement. If the packet is encapsulated, the process decapsulates (at 615) the packet and proceeds to 645, described below. It should be noted that, in some embodiments, the MFE performs additional processing to determine that the packet is not sent to an IP address associated with neither a VTEP nor a unique physical IP address that maps to a logical IP address. For example, management traffic or other types of traffic may be received and processed by the MFE in some embodiments.

If the packet is not encapsulated (i.e., because address replacement was performed on the packet at the source MFE), the process 600 essentially performs the opposite operations of those in FIG. 5. The process 600 determines (at 620) whether the protocol field matches one of a set of pre-specified mapped values. This identifies whether the protocol field value is one of the reserved or unused values to which a particular protocol field value (e.g., ICMP) is mapped. If this is the case, the process replaces (at 625) the protocol field value with the original value. For example, in FIG. 9, the MFE 905 maps the value 143 (a reserved value) back to the original value of 1 (for ICMP).

The process 600 identifies (at 630) the logical IP address and interface for the source and destination physical IP addresses. As noted, each physical IP address maps not just to a logical IP address but also to a logical interface. While the source interface is not necessarily critical for the destination MFE (although it could be, depending on the processing required), the destination interface is important in terms of delivering the packet to the appropriate interface.

Based on the information identified from the physical IP addresses, the process 600 replaces (at 635) the physical IP addresses in the packet with the identified logical IP addresses. These should be the logical IP addresses that were in the packet prior to address replacement by the source MFE. In addition, the process replaces (at 640) the physical MAC addresses with logical MAC addresses based on the logical network topology. If the source and destination interfaces are on the same logical switch, then the MAC addresses will be those that correspond to these interfaces. However, if the source interface is on a different logical switch from the destination interface, then the MAC address of the logical router interface that connects to the destination logical switch will be the source MAC address.

In FIG. 8, the source and destination IP addresses are converted back into 10.1.1.5 and 10.1.1.6, respectively, by the MFE 815. Similarly, because the source and destination interfaces (VM1 and VM2) are on the same logical switch 705, both the source and destination logical MAC addresses are those that correspond to the interfaces (i.e., the same as when the packet was sent to the MFE 805). However, in FIG. 9, the source logical MAC address in the packet 900 as sent from the MFE 905 to the destination VM4 is MAC F, the address of the logical router interface that connects to the logical switch 710. In addition, the destination logical MAC address for the packet is MAC D, the MAC address of the destination VM4. The MFE 905 identifies that the source interface is on a different logical switch 705 based on the network topology, and performs this MAC address replacement.

Having completed the reverse address replacement (or having decapsulated the packet), the process 600 performs (at 645) any additional logical processing, such as applying egress ACL rules, additional distributed firewall rules, etc. The process then delivers (at 650) the packet to the identified destination interface.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

FIG. 10 conceptually illustrates an electronic system 1000 with which some embodiments of the invention are implemented. The electronic system 1000 can be used to execute any of the control, virtualization, or operating system applications described above. The electronic system 1000 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 1000 includes a bus 1005, processing unit(s) 1010, a system memory 1025, a read-only memory 1030, a permanent storage device 1035, input devices 1040, and output devices 1045.

The bus 1005 collectively represents all system, peripheral, and chipset buses that communicatively connect the numerous internal devices of the electronic system 1000. For instance, the bus 1005 communicatively connects the processing unit(s) 1010 with the read-only memory 1030, the system memory 1025, and the permanent storage device 1035.

From these various memory units, the processing unit(s) 1010 retrieve instructions to execute and data to process in order to execute the processes of the invention. The processing unit(s) may be a single processor or a multi-core processor in different embodiments.

The read-only-memory (ROM) 1030 stores static data and instructions that are needed by the processing unit(s) 1010 and other modules of the electronic system. The permanent storage device 1035, on the other hand, is a read-and-write memory device. This device is a non-volatile memory unit that stores instructions and data even when the electronic system 1000 is off. Some embodiments of the invention use a mass-storage device (such as a magnetic or optical disk and its corresponding disk drive) as the permanent storage device 1035.

Other embodiments use a removable storage device (such as a floppy disk, flash drive, etc.) as the permanent storage device. Like the permanent storage device 1035, the system memory 1025 is a read-and-write memory device. However, unlike storage device 1035, the system memory is a volatile read-and-write memory, such a random access memory. The system memory stores some of the instructions and data that the processor needs at runtime. In some embodiments, the invention's processes are stored in the system memory 1025, the permanent storage device 1035, and/or the read-only memory 1030. From these various memory units, the processing unit(s) 1010 retrieve instructions to execute and data to process in order to execute the processes of some embodiments.

The bus 1005 also connects to the input and output devices 1040 and 1045. The input devices enable the user to communicate information and select commands to the electronic system. The input devices 1040 include alphanumeric keyboards and pointing devices (also called "cursor control devices"). The output devices 1045 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 10, bus 1005 also couples electronic system 1000 to a network 1065 through a network adapter (not shown). In this manner, the computer can be a part of a network of computers (such as a local area network ("LAN"), a wide area network ("WAN"), or an Intranet, or a network of networks, such as the Internet. Any or all components of electronic system 1000 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

It should be understood that while the specification refers to VMs, the examples given could be any type of DCNs, including physical hosts, VMs, non-VM containers, and hypervisor kernel network interface modules. In fact, the example networks could include combinations of different types of DCNs in some embodiments.

While the invention has been described with reference to numerous specific details, one of ordinary skill in the art will recognize that the invention can be embodied in other specific forms without departing from the spirit of the invention. In addition, a number of the figures (including FIGS. 2, 3, 5, and 6) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. For a network controller that manages a plurality of logical networks implemented by a plurality of managed forwarding elements (MFEs) operating on a plurality of host machines within a datacenter, a method comprising:
    receiving a notification from a particular MFE that an interface corresponding to a logical port of a logical forwarding element has connected to the particular MFE and has a particular logical network address;
    assigning a physical network address to the interface that is unique within a physical network of the datacenter, wherein each of a plurality of interfaces connected to the particular MFE is assigned a different physical network address unique within the physical network of the datacenter; and
    providing the assigned unique physical network address to the particular MFE for the particular MFE to replace the particular logical network address with the unique physical network address in data messages sent from the particular logical network address to other logical network destinations within the datacenter.

2. The method of claim 1, wherein the interface is a virtual interface of a data compute node (DCN) operating on a same host machine as the particular MFE.

3. The method of claim 2, wherein a plurality of DCNs operate on the same host machine as the particular MFE, wherein each of the DCNs has at least one interface connected to the particular MFE, the method further comprising assigning physical network addresses that are unique within the physical network of the datacenter for each of the interfaces.

4. The method of claim 3, wherein the particular logical network address is a first logical network address, the virtual interface is a first virtual interface, and the logical forwarding element is a first logical forwarding element of a first logical network, wherein a second virtual interface of a second DCN, connected to a second logical forwarding element of a second logical network, also has the particular logical network address, wherein different physical network addresses are assigned to the first and second virtual interfaces.

5. The method of claim 2, wherein the particular logical network address is a first logical network address and the unique physical network address is a first physical network address, wherein the DCN comprises at least a second virtual interface connected to the MFE and having a second logical network address, the method further comprising assigning a second physical network address that is unique within the physical network of the datacenter to the second virtual interface.

6. The method of claim 1, wherein the particular MFE is a first MFE, the interface is a first interface, the logical port is a first logical port, the logical network address is a first logical network address, and the unique physical network address is a first physical network address, the method further comprising:
    receiving a notification from a second MFE that a second interface corresponding to a second logical port of the logical forwarding element has connected to the second MFE and has a second logical network address;
    assigning a second physical network address to the second interface; and
    providing the assigned second physical network address to the second MFE for the second MFE to replace the second logical network address with the second physical network address in data messages sent from the second logical network address to other logical network destinations within the datacenter.

7. The method of claim 6, wherein the first and second logical network addresses are in a same first subnet, wherein the first and second physical network addresses are in different second and third subnets.

8. The method of claim 1, wherein the particular MFE further replaces the unique physical address with the particular logical network address in data messages sent to the unique physical address.

9. The method of claim 1, wherein the particular MFE is a first MFE, the method further comprising:
    receiving a request from a second MFE when the second MFE has received a data message with the particular logical network address as a destination address; and
    providing the unique physical network address to the second MFE for the second MFE to replace the particular logical network address with the unique physical network address as the destination address for at least a subsequent data message.

10. The method of claim 1, wherein the particular logical network address and unique physical network address are Internet Protocol (IP) addresses, the method further comprising assigning a physical media access control (MAC) address for the interface.

11. The method of claim 1, wherein the unique physical network address is assigned from a pool of physical network addresses.

12. The method of claim 1 further comprising:
receiving a notification from the particular MFE that the interface is no longer connected to the particular MFE;
allocating the unique physical network address to a waiting pool for a period of time; and
after the period of time, allocating the unique physical network address to a pool of available physical network addresses.

13. A non-transitory machine readable medium storing a network controller program which when executed by at least one processing unit manages a plurality of logical networks implemented by a plurality of managed forwarding elements (MFEs) operating on a plurality of host machines in a datacenter, the network controller program comprising sets of instructions for:
receiving a notification from a particular MFE that an interface corresponding to a logical port of a logical forwarding element has connected to the particular MFE and has a particular logical network address;
assigning a physical network address to the interface that is unique within a physical network of the datacenter, wherein each of a plurality of interfaces connected to the particular MFE is assigned a different physical network address unique within the physical network of the datacenter; and
providing the assigned unique physical network address to the particular MFE for the particular MFE to replace the particular logical network address with the unique physical network address in data messages sent from the particular logical network address to other logical network destinations within the datacenter.

14. The non-transitory machine readable medium of claim 13, wherein the interface is a virtual interface of a data compute node (DCN) operating on a same host machine as the particular MFE.

15. The non-transitory machine readable medium of claim 14, wherein a plurality of DCNs operate on the same host machine as the particular MFE, wherein each of the DCNs has at least one interface connected to the particular MFE, the network controller program further comprising a set of instructions for assigning physical network addresses that are unique within the physical network of the datacenter for each of the interfaces.

16. The non-transitory machine readable medium of claim 15, wherein the particular logical network address is a first logical network address, the virtual interface is a first virtual interface, and the logical forwarding element is a first logical forwarding element of a first logical network, wherein a second virtual interface of a second DCN, connected to a second logical forwarding element of a second logical network, also has the particular logical network address, wherein different physical network addresses are assigned to the first and second virtual interfaces.

17. The non-transitory machine readable medium of claim 13, wherein the particular MFE is a first MFE, the interface is a first interface, the logical port is a first logical port, the logical network address is a first logical network address, and the unique physical network address is a first physical network address, the network controller program further comprising sets of instructions for:
receiving a notification from a second MFE that a second interface corresponding to a second logical port of the logical forwarding element has connected to the second MFE and has a second logical network address;
assigning a second physical network address to the second interface;
providing the assigned second physical network address to the second MFE for the second MFE to replace the second logical network address with the second physical network address in data messages sent from the second logical network address to other logical network destinations within the datacenter.

18. The non-transitory machine readable medium of claim 17, wherein the first and second logical network addresses are in a same first subnet, wherein the first and second physical network addresses are in different second and third subnets.

19. The non-transitory machine readable medium of claim 13, wherein the particular MFE is a first MFE, the network controller program further comprising sets of instructions for:
receiving a request from a second MFE when the second MFE has received a data message with the particular logical network address as a destination address; and
providing the unique physical network address to the second MFE for the second MFE to replace the particular logical network address with the unique physical network address as the destination address for at least a subsequent data message.

20. The non-transitory machine readable medium of claim 13, wherein the network controller program further comprises sets of instructions for:
receiving a notification from the particular MFE that the interface is no longer connected to the particular MFE;
allocating the unique physical network address to a waiting pool for a period of time; and
after the period of time, allocating the unique physical network address to a pool of available physical network addresses.

* * * * *